US011086337B2

(12) United States Patent
Collins et al.

(10) Patent No.: US 11,086,337 B2
(45) Date of Patent: Aug. 10, 2021

(54) SYSTEMS AND METHODS FOR CHARGING UNMANNED AERIAL VEHICLES ON A MOVING PLATFORM

(71) Applicant: Planck Aerosystems Inc., San Diego, CA (US)

(72) Inventors: Gaemus Collins, San Diego, CA (US);
Aubrey Clausse, San Diego, CA (US);
David Twining, San Diego, CA (US)

(73) Assignee: Planck Aerosystems Inc., San Diego, CA (US)

( * ) Notice: Subject to any disclaimer, the term of this patent is extended or adjusted under 35 U.S.C. 154(b) by 203 days.

(21) Appl. No.: 16/012,498

(22) Filed: Jun. 19, 2018

(65) Prior Publication Data

US 2018/0364740 A1 Dec. 20, 2018

Related U.S. Application Data

(60) Provisional application No. 62/556,044, filed on Sep. 8, 2017, provisional application No. 62/522,563, filed on Jun. 20, 2017.

(51) Int. Cl.
*G05D 1/06* (2006.01)
*G05D 1/00* (2006.01)
(Continued)

(52) U.S. Cl.
CPC ......... *G05D 1/0684* (2013.01); *B64C 39/024* (2013.01); *G05D 1/0088* (2013.01);
(Continued)

(58) Field of Classification Search
CPC .. G05D 1/0684; G05D 1/0088; G05D 1/0661; B64C 39/024; G06K 9/00624;
(Continued)

(56) References Cited

U.S. PATENT DOCUMENTS 5,235,513 A 8/1993 Velger et al.
5,457,639 A 10/1995 Ulich et al.
(Continued)

FOREIGN PATENT DOCUMENTS

CN 103868521 B 6/2016
CN 206485525 U 9/2017
(Continued)

OTHER PUBLICATIONS

PCT/US2018/038330 International Search Report and Written Opinion dated Sep. 18, 2018.
(Continued)

*Primary Examiner* — Hussein Elchanti
(74) *Attorney, Agent, or Firm* — Wilson Sonsini Goodrich & Rosati

(57) ABSTRACT

Disclosed herein are system and method for automatically recharging a unmanned aerial vehicle (UAV) on a moving platform, comprising: a software module identifying the moving platform; a software module estimating a real-time state of the moving platform; a software module controlling automatic landing of the UAV on the moving platform based on the real-time state estimation of the moving platform and data collected from the one or more sensors; a software module controlling automatic connection of the UAV to a charging station of the moving platform with a pre-determined orientation; and a software module controlling automatic taking off of the UAV from the moving platform after charging.

15 Claims, 8 Drawing Sheets

(51) Int. Cl.
    *B64C 39/02* (2006.01)
    *G08G 5/02* (2006.01)
    *G06K 9/00* (2006.01)
    *G08G 5/00* (2006.01)
    *G06K 9/32* (2006.01)

(52) U.S. Cl.
    CPC ....... *G05D 1/0661* (2013.01); *G06K 9/00624* (2013.01); *G06K 9/00637* (2013.01); *G06K 9/3216* (2013.01); *G08G 5/0021* (2013.01); *G08G 5/0069* (2013.01); *G08G 5/0073* (2013.01); *G08G 5/025* (2013.01); *B64C 2201/066* (2013.01); *B64C 2201/141* (2013.01)

(58) Field of Classification Search
    CPC ............. G06K 9/00637; G06K 9/3216; G08G 5/0021; G08G 5/0069; G08G 5/0073; G08G 5/025
    See application file for complete search history.

(56) References Cited

U.S. PATENT DOCUMENTS

| | | | |
|---|---|---|---|
| 5,906,336 | A | 5/1999 | Eckstein |
| 6,064,924 | A | 5/2000 | Fleischmann |
| 6,868,314 | B1 | 3/2005 | Frink |
| 8,148,992 | B2 | 4/2012 | Kowalczyk et al. |
| 9,056,676 | B1 | 6/2015 | Wang |
| 9,139,310 | B1 * | 9/2015 | Wang ............... B64C 39/02 |
| 9,896,203 | B1 * | 2/2018 | Kim ................. B64C 25/52 |
| 10,023,326 | B2 * | 7/2018 | Byers .............. B64C 39/024 |
| 10,053,217 | B2 * | 8/2018 | Cho ................ B64C 39/024 |
| 10,209,707 | B2 * | 2/2019 | Matuszeski ......... G05D 1/0016 |
| 10,322,820 | B2 * | 6/2019 | Husain .............. B60L 53/30 |
| 10,370,102 | B2 * | 8/2019 | Boykin ............ G08B 13/1966 |
| 10,373,097 | B2 * | 8/2019 | Kulkarni ........... B64C 39/024 |
| 10,434,885 | B2 * | 10/2019 | Antonini .......... B64C 39/024 |
| 10,553,122 | B1 * | 2/2020 | Gilboa-Amir ....... G08G 5/0069 |
| 10,604,020 | B2 * | 3/2020 | Ricci ................ B60L 5/005 |
| 10,701,913 | B2 | 7/2020 | Twining et al. |
| 2006/0058928 | A1 | 3/2006 | Beard et al. |
| 2008/0207067 | A1 | 8/2008 | Ricciuti et al. |
| 2008/0260467 | A1 | 10/2008 | Kroecker et al. |
| 2011/0049288 | A1 | 3/2011 | Suzuki |
| 2011/0049290 | A1 | 3/2011 | Seydoux et al. |
| 2011/0068224 | A1 | 3/2011 | Kang et al. |
| 2011/0202209 | A1 | 8/2011 | Moresve |
| 2011/0307126 | A1 | 12/2011 | Hogstrom |
| 2012/0076397 | A1 | 3/2012 | Moresve |
| 2012/0271461 | A1 | 10/2012 | Spata |
| 2013/0054054 | A1 | 2/2013 | Tollenaere et al. |
| 2013/0120166 | A1 | 5/2013 | Kommuri et al. |
| 2014/0111332 | A1 | 4/2014 | Przybylko et al. |
| 2014/0124621 | A1 | 5/2014 | Godzdanker et al. |
| 2014/0152792 | A1 | 6/2014 | Krueger |
| 2014/0222246 | A1 | 8/2014 | Mohamadi |
| 2014/0236390 | A1 | 8/2014 | Mohamadi |
| 2014/0324253 | A1 | 10/2014 | Duggan et al. |
| 2014/0350754 | A1 | 11/2014 | Elgersma et al. |
| 2014/0379173 | A1 | 12/2014 | Knapp et al. |
| 2015/0025797 | A1 | 1/2015 | Hardesty et al. |
| 2015/0183498 | A1 | 7/2015 | Wardle |
| 2015/0207964 | A1 | 7/2015 | Bye et al. |
| 2015/0253126 | A1 | 9/2015 | Palandro et al. |
| 2015/0262492 | A1 | 9/2015 | Barnes et al. |
| 2015/0277442 | A1 | 10/2015 | Ballou |
| 2015/0298654 | A1 | 10/2015 | Joao et al. |
| 2015/0304813 | A1 | 10/2015 | Esposito et al. |
| 2015/0336669 | A1 * | 11/2015 | Kantor ............... G01C 21/3415 701/3 |
| 2015/0353206 | A1 | 12/2015 | Wang |
| 2015/0370250 | A1 | 12/2015 | Bachrach et al. |
| 2015/0370251 | A1 | 12/2015 | Siegel et al. |
| 2016/0124431 | A1 * | 5/2016 | Kelso ................ G06K 7/1426 701/28 |
| 2016/0144734 | A1 | 5/2016 | Wang et al. |
| 2016/0306824 | A1 | 10/2016 | Lopez et al. |
| 2016/0340006 | A1 | 11/2016 | Tang |
| 2016/0364989 | A1 | 12/2016 | Speasl et al. |
| 2016/0376000 | A1 | 12/2016 | Kohstall |
| 2017/0069214 | A1 | 3/2017 | Dupray et al. |
| 2017/0129603 | A1 | 5/2017 | Raptopoulos et al. |
| 2017/0139424 | A1 | 5/2017 | Li |
| 2017/0197718 | A1 | 7/2017 | Buchmueller |
| 2017/0240277 | A1 | 8/2017 | Molnar et al. |
| 2017/0267374 | A1 | 9/2017 | Derenick et al. |
| 2017/0301109 | A1 * | 10/2017 | Chan ................ G06K 9/0063 |
| 2018/0072419 | A1 | 3/2018 | Burgess et al. |
| 2018/0101173 | A1 * | 4/2018 | Banerjee ............ G05D 1/0684 |
| 2018/0173245 | A1 | 6/2018 | Twining et al. |
| 2018/0186433 | A1 | 7/2018 | Gharabegian |
| 2018/0217256 | A1 | 8/2018 | Stokes |
| 2018/0321680 | A1 | 11/2018 | Tu |
| 2019/0128711 | A1 | 5/2019 | Connor et al. |
| 2019/0202530 | A1 | 7/2019 | Rikoski |
| 2019/0266712 | A1 | 8/2019 | Chirayath |
| 2020/0011995 | A1 | 1/2020 | Send et al. |

FOREIGN PATENT DOCUMENTS

| | | |
|---|---|---|
| EP | 3274256 A2 | 1/2018 |
| KR | 20130009893 A | 1/2013 |
| KR | 101236195 B1 | 2/2013 |
| TW | 201445470 A | 12/2014 |
| WO | WO-2006132713 A2 | 12/2006 |
| WO | WO-2010071502 A1 | 6/2010 |
| WO | WO-2013100849 A1 | 7/2013 |
| WO | WO-2013171735 A1 | 11/2013 |
| WO | WO-2014016240 A1 | 1/2014 |
| WO | WO-2015012935 A2 | 1/2015 |
| WO | WO-2015154148 A1 | 10/2015 |
| WO | WO-2015179797 A1 | 11/2015 |
| WO | WO-2016204843 A2 | 12/2016 |
| WO | WO-2017027836 A1 | 2/2017 |
| WO | WO-2017123768 A1 | 7/2017 |
| WO | WO-2019226917 A1 | 11/2019 |

OTHER PUBLICATIONS

PCT/US2016/024347 International Preliminary Report on Patentability dated Oct. 12, 2017.
PCT/US2016/024347 International Search Report and Written Opinion dated Jan. 10, 2017.
PCT/US2017/013203 International Preliminary Report on Patentability dated Jul. 17, 2018.
PCT/US2017/013203 International Search Report and Written Opinion dated Apr. 25, 2017.
EP16812080.6 European Office Action dated Mar. 10, 2020.
EP16812080.6 Extended Search Report dated Sep. 28, 2018.
European Application No. 17738939.2 Search Report dated Jul. 31, 2019.
Gautam et al.: A survey of autonomous landing techniques for UAVs. International Conference on Unmanned Aircraft Systems (ICUAS), IEEE . Orlando, Fl. (pp. 1210-1218) (2014).
PCT/US2019/033792 International Search Report and Written Opinion dated Aug. 28, 2019.
Taiwanese Patent Application No. 105109691 Office Action dated Feb. 21, 2020 (with English Translation).
U.S. Appl. No. 15/561,400 Final Action dated Jan. 7, 2019.
U.S. Appl. No. 15/561,400 Final Office Action dated Aug. 8, 2019.
U.S. Appl. No. 16/069,861 Office Action dated Oct. 1, 2019.
Yoo et al.: Sea wave modeling and shipboard landing simulation of tilt rotor unmanned aerial vehicle. 2013 13th International Conference on Control, Automation and Systems (ICCAS 2013), IEEE. Kimdaejung Convention Center, Gwangju, Korea. (pp. 1854-1859) (2013).

* cited by examiner

Original image of the launch/landing target with shadows and occlusions.

Target edges are used to detect line segments.

Line segments with notches indicating directionality. Multiple sides of the target have obscured edges.

Target detection: A quad detection algorithm connects the corners, filling in the missing information.

Initial search for target pattern

Target detected - software locks on to target

Software maintains lock during landing

SYSTEMS AND METHODS FOR CHARGING UNMANNED AERIAL VEHICLES ON A MOVING PLATFORM

CROSS-REFERENCE

This application claims the benefit of U.S. Provisional Patent Application No. 62/522,563 filed Jun. 20, 2017, and U.S. Provisional Patent Application No. 62/556,044 filed Sep. 8, 2017, each of which are incorporated here in by reference in its entirety.

BACKGROUND OF THE INVENTION

Robots are machines that are typically programmable by a computer and are capable of carrying out a complex series of actions. Unmanned aerial vehicles (UAVs) are certain types of robotic devices that can be used for performing surveillance, reconnaissance, and exploration tasks for military and civilian applications.

SUMMARY OF THE INVENTION

Offshore energy production assets, especially wind turbines, are being increasingly installed and operated, and are a rapidly growing source of energy in many countries throughout the world. Offshore energy production assets require frequent detailed inspection to ensure the ongoing health, safety, and financial viability of the asset. However, current inspection techniques are expensive and dangerous, requiring humans to be deployed into the field, often into harsh offshore environments. In most current inspection scenarios, a manned vessel is deployed to the wind turbine. The wind turbine is turned off while a human climbs the structure and performs a detailed inspection. This process may take 6-8 hours per wind turbine, and involves a high level of risk.

Described herein in certain applications is a UAV that can be launched from the ground, boat, or other vehicle, then flown up, over, and around a wind turbine, capturing high resolution images of the asset which can be used for inspection. This can significantly speed up the inspection process, and may only require 1.5 hours per wind turbine. It has the added benefit of reducing risk by not requiring a human to ascend the turbine.

In some aspects, also described herein are drones that are configured to be deployed from vessels to perform offshore inspections. However, operating a drone from a vessel is incredibly difficult, and requires an expert UAV pilot. Furthermore, this work requires multiple humans to be deployed into a potentially harsh maritime environment. Such operations of offshore wind turbine inspection are associated with high cost and risk.

In some cases, UAVs are coupled with unmanned surface vehicles (USV) and/or unmanned ground vehicles (UGV), to form a functional heterogeneous unmanned system that can be sent out into the field for long periods of time to perform a wide range of tasks. These unmanned systems have commercial, industrial, and defense applications with significant advantages.

In some cases, an unmanned USV-UAV team is designed to replace the need to deploy humans to inspect offshore energy production facilities, such as wind turbines. One benefit of the USV-UAV team is an improvement in the efficiency and reduction in the risk associated with inspections. The unmanned team also provides cost savings for both the turbine inspectors and the turbine operators, as well as of lower risk to humans that would otherwise be deployed to perform inspections.

In certain applications, the methods, devices, and systems described herein provide an unmanned team that can have many other advantages comparing with existing UAV-USV teams. These advantages includes but are not limited to: reduced inspection costs due to automating the inspection process with robots, more frequent inspections feasible due to lower cost to keep system deployed, improved safety and lower risk due to fewer deployed human inspectors, reduced repair costs due to persistent inspection, even in harsh environmental conditions, increased energy reliability by minimizing the minimizing the downtime of the wind turbine, or even continued operation during inspection.

Further, unmanned systems including UAVs present additional benefits over traditional human inspections. One benefit is the possibility for persistence, wherein the unmanned system can perform frequent and ongoing inspections, even in degraded environmental conditions that might prevent manned inspections. In further cases, with highly quality camera, for example, large format, high pixel density cameras using a global shutter, it may be possible to for the facility, for example, wind turbines, to continue to operate during the inspection, even if that operation would ordinarily be dangerous to a human inspector. Additionally, unmanned system also may allow high fidelity data that is compatible with existing analysis tools to be reliably collected with a fully unmanned system.

Significant advancement in unmanned vehicle technologies and capabilities has allowed for increased incorporation of these vehicles into real world situations. In some cases, the unmanned vehicles described herein provide opportunities for more complex autonomous behaviors allowing unmanned systems to transition from being merely remotely-operated assets to perceiving, sharing data products, and planning to meet command intent. Of particular interest is cooperative interaction between teams of two or more heterogeneous autonomous vehicles. In some cases, these vehicles can operate in synergistic behavior to accomplish complex missions through real-time perception, cooperative planning and sensor data sharing.

Compared to homogenous teams, heterogeneous teams are more complex to deploy, control, and maintain. However, they offer significant advantages over homogeneous teams. In embodiments, unique capabilities of each platform type can be exploited, resulting in a more capable overall system. UAV, for example, may collect data unavailable to a surface vehicle. USVs may provide capabilities such as long endurance and range, recharging, and satellite communication links.

For example, a commercial market for the heterogeneous team is infrastructure inspection of offshore energy assets, such as offshore wind farms and oil & gas platforms. These assets are very expensive and operate continuously in harsh environments, so they need to be inspected often. Currently, inspections are performed from a manned vessel, and require a trained human inspector to climb the platform and visually examine the structure. During this operation, the energy production is typically shut off for safety purposes. Furthermore, these inspections are only possible during good weather conditions, even though many offshore energy production infrastructure is installed in locations that typically have harsh weather. A UAV-USV team could deploy to such offshore energy production facility, such as a wind turbine farm, and navigate to a relatively close proximity of a wind turbine. Small UAV are agile and can execute precise flight maneuvers, such as flying up, over, and around a wind turbine to collect high resolution imagery and other sensor data necessary for a detailed inspection. At the completion of the inspection, the UAV returns to the USV and then transits to another wind turbine and repeats the inspection process. These inspections could be fully automated and preformed throughout a wind farm over and over. Missions could be pre-programmed or modified remotely through the USV's communications links. These inspections could also be conducted with the wind turbines operating and in harsh weather.

For example, in some embodiments of the subject matter described herein, different types of operations could be performed as well with the same basic functional elements including unmanned UAV, USV, and/or UGV. They key enabler to these types of applications is that the UAV is utilizing the technologies described herein to safely and reliably return to the USV, perform a precision landing, and recharge for additional flights.

Recently, standalone charging stations for drones have been developed. These require that a drone precisely lands on a platform that then charges the onboard battery via conduction or induction, or robotically exchanges the battery. Even though these technologies are in their infancy, they hold great promise since they will allow drone systems to be repeatedly deployed without user intervention. However, these systems are not suitable for use from moving platforms.

Existing UAV charging systems are stationary. Even if one was to a moving truck, there has previously been no feasible means to get the UAV to land precisely on that truck without being operated by a highly skilled pilot. Therefore, it would not be a fully autonomous or unmanned system. Charging a UAV using the existing technologies requires either manually plugging in a battery, or precisely placing it on a recharging station. Some of these stations will automatically swap out a battery. However, there has previously been no means to use these systems from moving platforms.

System and method disclosed herein enabling automatically recharging a UAV on a moving USV or UGV includes a variety of advantages over existing technologies. One advantage of the system and method disclosed herein is that drones may repeatedly operate from vehicles without user intervention. This allows an unmanned teamed system to collect much more data, including aerial data, which was not previously possible. It also allows for new missions that were not previously possible. For example, current unmanned vessels can be deployed for days or weeks with ranges in the hundreds or thousands of nautical miles. Such unmanned vessels are very useful for a wide range of applications. However, their usefulness can be multiplied by teaming it with an unmanned aircraft that can fly missions from it. For this to occur for long durations, the aircraft must be able to recharge or refuel from when on or near the unmanned vessel. Precision landing capabilities on a moving platform enable the automatic recharging of a UAV on a moving USV or UGV, or even a manned vehicle.

Disclosed herein, in some cases, are software modules and/or algorithms for autonomous takeoff and landing to moving platforms that can charge, recharge, exchange batteries, or refuel a drone. Disclosed herein, in some cases, is a heterogeneous unmanned team designed for autonomous persistent inspection, for a non-limiting example, inspection of offshore wind turbines. In some cases, this unmanned team includes an unmanned surface vessel (USV) and an unmanned aerial system (UAV) operating cooperatively. USVs have long endurance, and can be deployed for weeks or months at a time. They can navigate close to an offshore wind turbine. Disclosed herein are non-limiting exemplary operations (CONOPS) in which a UAV is deployed from a USV, performs an inspection, and then returns to the USV so that it can transit to a different offshore wind turbine and initialize another inspection. Disclosed herein, in some cases, are technologies to enable this unmanned system. Disclosed herein also includes hardware, software, and other elements that integrate the component technologies into a heterogeneous team that works synergistically. Disclosed herein, in some cases, are autonomous high-precision launch and landing of a UAV from a USV. Disclosed herein, in some cases, is autonomous landing/launching of UAV on a moving platform of a USV or UGV for charging or other operations.

In one aspect, disclosed herein are unmanned aerial vehicles (UAV) that automatically recharges on a moving platform, the UAV comprising: a rechargeable power source; one or more sensors; a digital processing device comprising an operating system configured to perform executable instructions and a memory; and a computer program including instructions executable by the digital processing device to automatically charge the UAV on the moving platform comprising: a software module identifying the moving platform; a software module estimating a real-time state of the moving platform; a software module controlling automatic landing of the UAV on the moving platform based on the real-time state estimation of the moving platform and data collected from the one or more sensors; a software module controlling automatic connection of the UAV to a charging station of the moving platform with a pre-determined orientation; and a software module controlling automatic taking off of the UAV from the moving platform after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, the size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials changes dynamically when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the UAV disclosed herein further comprises a wireless communication unit that communicates with the moving platform. In some embodiments, the UAV disclosed herein further comprises a software module transmitting a position, motion, velocity, acceleration, or orientation of the UAV to the moving platform. In some embodiments, the UAV disclosed herein further comprises a software module transmitting a position, motion, velocity, acceleration, or orientation of the moving platform to the UAV. In some embodiments, identifying the moving platform comprises identifying a landing target on the moving platform. In some embodiments, the UAV disclosed herein further comprises a software module tracking the landing target on the moving platform during automatic landing of the UAV. In some embodiments, the moving platform comprising a wireless communication unit that communicates with a remote control system. In some embodiments, the digital processing device includes a low-size, weight and power (low-SWaP) embedded processor. In some embodiments, the digital processing device is configured to communicate commands to a controller that control one or more propellers, wings or controllable surfaces. In some embodiments, the UAV disclosed herein further comprises a reversible mechanical interface configured to secure the UAV to the moving platform during charging. In some embodiments, the automatic landing of the UAV to the moving platform is substantially vertical to the moving platform within a distance to the moving platform. In some embodiments, the automatic taking off the UAV from the moving platform is substantially vertical to the moving platform within a distance to the moving platform.

In another aspect, disclosed herein are methods for automatically charging a unmanned aerial vehicle (UAV) on a moving platform, the method comprising: detecting the moving platform using one or more sensors of the UAV; estimating a real-time state of the moving platform by a computer of the UAV; automatically landing the UAV on the moving platform by the computer, based on the real-time state and data collected from the one or more sensors, wherein the UAV is in a preselected orientation; connecting the UAV to a charging station on the moving platform; and relaunching the UAV after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the methods disclosed herein further comprise communicating with the moving platform via a wireless communication unit. In some embodiments, the methods disclosed herein further comprises transmitting a position, motion, velocity, acceleration, or orientation of the UAV to the moving platform. In some embodiments, the methods disclosed herein further comprises a software module transmitting a position, motion, velocity, acceleration, or orientation of the moving platform to the UAV. In some embodiments, detecting the moving platform comprises identifying a landing target on the moving platform. In some embodiments, the methods disclosed herein further comprise tracking the landing target on the moving platform during automatic landing of the UAV. In some embodiments, the moving platform comprising a wireless communication unit that communicates with a remote control system. In some embodiments, the computer includes a low-size, weight and power (low-SWaP) embedded processor. In some embodiments, the methods disclosed herein further comprise communicating commands to the one or more propellers. In some embodiments, the methods disclosed herein further comprises securing the UAV to the moving platform during charging via a reversible mechanical interface, a reversible magnetic interface, or a combination of mechanical and magnetic interfaces. In some embodiments, relaunching the UAV after charging is substantially vertical to the moving platform within a distance to the moving platform.

In yet another aspect, disclosed herein are non-transitory computer-readable storage media encoded with a computer program including instructions executable by a processor to allow automatic charging of a unmanned aerial vehicle (UAV) on a moving platform comprising: a software module identifying the moving platform; a software module estimating a real-time state of the moving platform; a software module controlling automatic landing of the UAV on the moving platform based on the real-time state estimation of the moving platform and data collected from one or more sensor of the UAV; a software module controlling automatic connection of the UAV to a charging station of the moving platform with a pre-determined orientation; and a software module controlling automatic taking off of the UAV from the moving platform after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered.

In some embodiments, size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the media further comprise a software module transmitting a position, motion, velocity, acceleration, or orientation of the UAV to the moving platform. In some embodiments, identifying the moving platform comprises identifying a landing target on the moving platform. In some embodiments, the media further comprise a software module tracking the landing target on the moving platform during automatic landing of the UAV. In some embodiments, the moving platform comprising a wireless communication unit that communicates with a remote control system. In some embodiments, the processor includes a low-size, weight and power (low-SWaP) embedded processor. In some embodiments, the processor is configured to communicate commands that control one or more propellers, wings, or other controllable surfaces.

In yet another aspect, disclosed herein are heterogeneous unmanned teams for conducting autonomous offshore inspections, the team comprising: an unmanned surface vehicle (USV) or ground vehicle (UGV) comprising a moving platform, a landing target, and a charging station; and the unmanned aerial vehicle (UAV) comprising: a digital processing device comprising an operating system configured to perform executable instructions and a memory; and a computer program including instructions executable by the digital processing device to automatically charge the UAV on the moving platform comprising: a software module identifying the moving platform; a software module estimating a real-time state of the moving platform; a software module controlling automatic landing of the UAV on the moving platform based on the real-time state estimation of the moving platform and data collected from one or more sensor of the UAV; and a software module controlling automatic taking off of the UAV from the moving platform after charging. In some cases, the heterogeneous unmanned teams disclosed herein further comprise a software module allowing the USV to wirelessly communicate with an unmanned aerial vehicle (UAV), wherein the communication includes a real-time state of the moving platform. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, the size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials changes dynamically when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the UAV disclosed herein further comprises a wireless communication unit that communicates with the moving platform. In some embodiments, the UAV disclosed herein further comprises a software module transmitting a position, motion, velocity, acceleration, or orientation of the UAV to the moving platform. In some embodiments, the UAV disclosed herein further comprises a software module transmitting a position, motion, velocity, acceleration, or orientation of the moving platform to the UAV. In some embodiments, identifying the moving platform comprises identifying a landing target on the moving platform. In some embodiments, the UAV disclosed herein further comprises a software module tracking the landing target on the moving platform during automatic landing of the UAV. In some embodiments, the moving platform comprising a wireless communication unit that communicates with a remote control system. In some embodiments, the digital processing device includes a low-size, weight and power (low-SWaP) embedded processor. In some embodiments, the digital processing device is configured to communicate commands to a controller that control one or more propellers, wings or controllable surfaces. In some embodiments, the UAV disclosed herein further comprises a reversible mechanical interface configured to secure the UAV to the moving platform during charging. In some embodiments, the automatic landing of the UAV to the moving platform is substantially vertical to the moving platform within a distance to the moving platform. In some embodiments, the automatic taking off the UAV from the moving platform is substantially vertical to the moving platform within a distance to the moving platform.

In yet another aspect, disclosed herein are unmanned surface vehicles (USVs) or ground vehicle (UGVs) that automatically charges a unmanned aerial vehicle (UAV), the USV comprising: a landing target; a moving platform; a charging station comprising an electronic interface that automatically charges a rechargeable power source onboard the UAV; a reversible interface configured to secure the UAV when landed; a digital processing device comprising an operating system configured to perform executable instructions and a memory; and a computer program including instructions executable by the digital processing device to automatically charge the comprising: a software module allowing the moving platform to wirelessly communicate with the UAV, the communication including a real-time state of the moving platform; and a software module allowing the charging station to automatically charge the UAV to a pre-determined power level.

In yet another aspect, disclosed herein are moving platforms for allowing automatic landing of a unmanned aerial vehicle (UAV) thereon or automatic taking off of the UAV therefrom, the moving platform comprising a landing target comprising: a series of nested fiducials on or near the moving platform detectable by one or more sensors of the UAV; a dynamically changing tag on or near the moving platform detectable by the one or more sensors of the UAV; or a combination thereof. In some embodiments, at least one of the series of nested fiducials is visually detectable by the one or more sensors of the UAV using a pre-determined light band. In some embodiments, the pre-determined light band is a visible light band. In some embodiments, the dynamically changing tag is visually detectable by the one or more sensors of the UAV using a predetermined light band. In some embodiments, the predetermined light band is a visible light band. In some embodiments, the series of nested fiducials are co-centered. In some embodiments, the series of nested fiducials overlaps at least partially with each other. In some embodiments, the series nested fiducials is gradually decreasing in size. In some embodiments, at least one of the series of nested fiducials comprises masked 1 information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the landing target is in close vicinity to a charging station onboard the moving platform. In some embodiments, the moving platform is on an unmanned surface vehicle (USV) or ground vehicle (UGV). In some embodiments, detection of the landing target by the one or more sensors of the UAV includes post-processing the detected landing target via one or more algorithms onboard the UAV. In some embodiments, the one or more algorithms includes: filtering; sampling, mathematical manipulation, statistical manipulation, segmentation, contouring, clustering, pattern recognition, registration, masking, decoding, encoding, or a combination thereof.

Another aspect provided herein is a platform for operating an unmanned aerial vehicle (UAV) from a vehicle: the vehicle comprising a landing pad, a landing target, and a charging station; and the UAV comprising: a UAV sensor configured to record a sensed data; an energy storage device; a wireless communication device configure to communicate with at least the vehicle; and a non-transitory computer-readable storage media encoded with a computer program including instructions executable by a processor to create a UAV charging application comprising: a landing pad recognition module identifying the landing pad based on the sensed data; a calculation module estimating a real-time state of the landing pad based on the sensed data, the identification of the landing pad, or both; a navigation module controlling the UAV to: land on the landing pad based on the real-time state, the sensor data, or both; and take off from the landing pad; and an energy module initiating and ceasing charging of the energy storage device via the charging station.

In some embodiments, the UAV sensor comprises a location sensor, a camera, an inertial sensor, an altitude sensor, a pressure sensor, an audio sensor, a field sensor, or any combination thereof. In some embodiments, the real-time state of the landing pad comprises a position, velocity, acceleration, orientation, or any combination thereof. In some embodiments, the vehicle further comprises a tag, wherein at least one of the identification and the real-time state of the landing pad is estimated based the tag. In some embodiments, the tag comprises:a visual fiducial; a series of nested fiducials; a series of co-centered nested fiducials; a dynamically changing tag; a GPS position; an RF signal; an inertial data; or any combination thereof. In some embodiments, the series of nested fiducials comprises masked information. In some embodiments, the series of nested fiducials is within a field of view of the UAV when landing. In some embodiments, at least one of the series of nested fiducials moves outside of a field of view of the UAV when landing. In some embodiments, a size of one or more of the series of nested fiducials changes dynamically during UAV landing. In some embodiments, the dynamically changing tag remains within a field of view of the UAV when landing. In some embodiments, the dynamically changing tag is projected on or near the platform. In some embodiments, the wireless communication device is configured to communicate at least one of a position, motion, velocity, acceleration, and an orientation of the UAV to the landing pad, via the wireless communication device. In some embodiments, the UAV charging application further comprises a status module receiving at least one of the position, the motion, the velocity, the acceleration, and the orientation of the UAV to landing pad. In some embodiments, identifying the landing pad comprises identifying the landing target on the landing pad. In some embodiments, the landing pad comprises a wireless communication unit configured to communicate with a remote control system. In some embodiments, landing pad comprises a wireless communication unit configured to communicate with a remote control system. In some embodiments, the non-transitory computer-readable storage media comprises a low-size, weight and power (low-SWaP) embedded processor. In some embodiments, the navigation module controlling the UAV comprises controlling a UAV propeller, a UAV wing, a UAV control surface, or any combination thereof. In some embodiments, the vehicle further comprises a reversible mechanical interface configured to secure the UAV to the landing pad. In some embodiments, at least one of the navigation module controlling the UAV to take off, and the navigation module controlling the UAV to land, comprises controlling the UAV to move in a direction substantially vertical to the landing pad within a distance to the landingpad.

DETAILED DESCRIPTION

Figure 1:
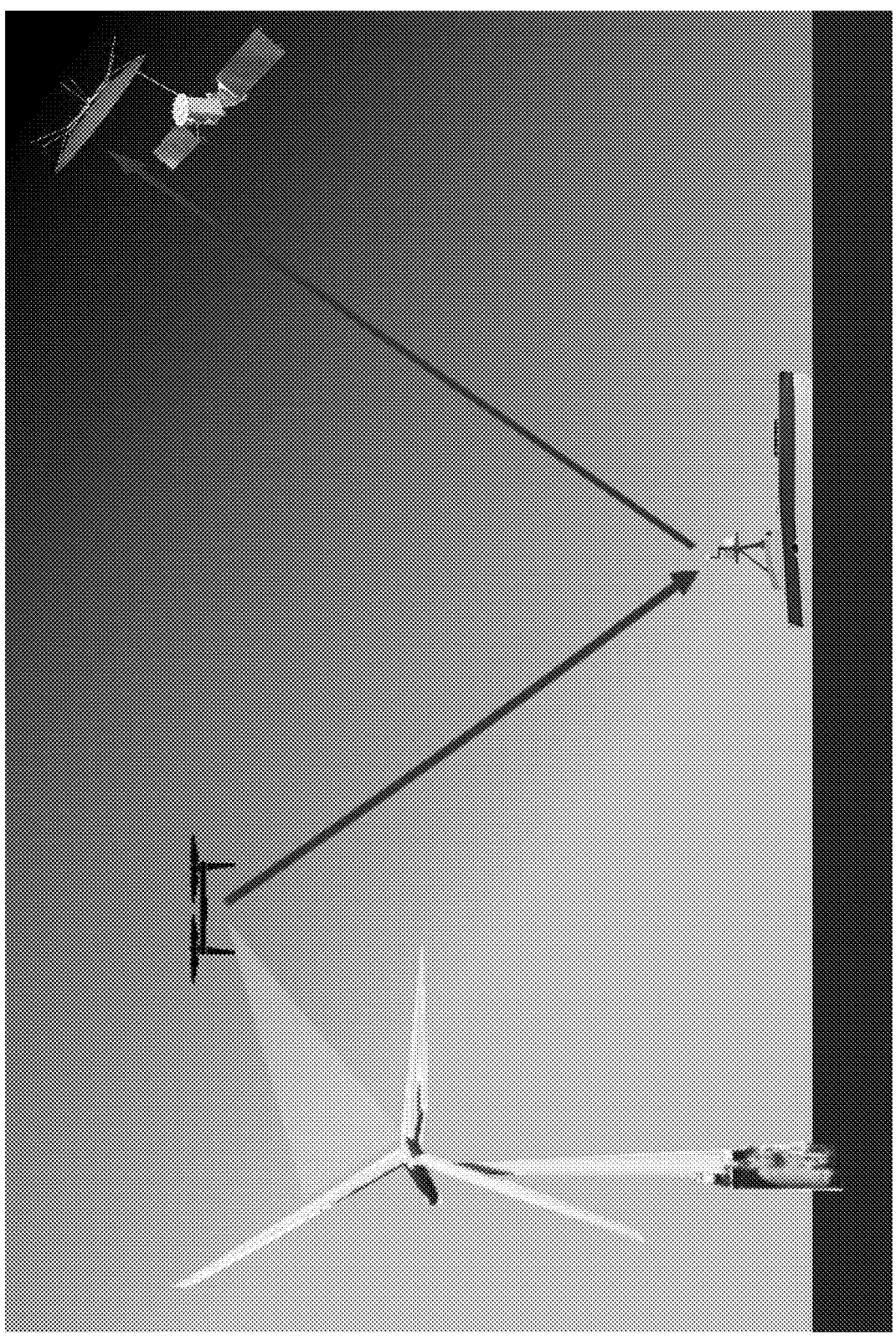
FIG. 1 shows a non-limiting exemplary embodiment of a heterogeneous unmanned team disclosed herein.
Figure 2A:
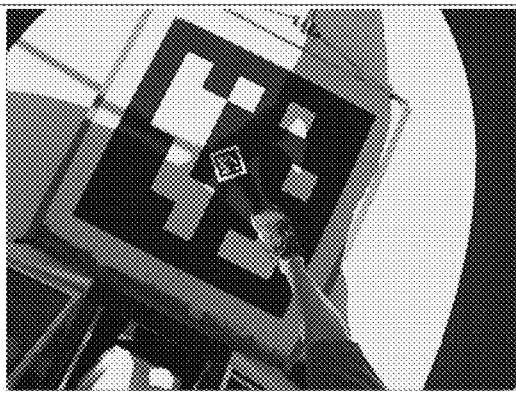
FIG. 2A shows a non-limiting exemplary embodiment of landing target image with lighting conditions and occlusions.
Figure 2B:
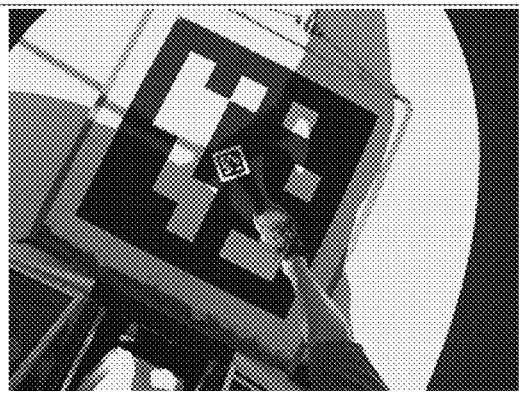
FIG. 2B shows a non-limiting exemplary embodiment of target edge detection with lighting conditions and occlusions.
Figure 2C:
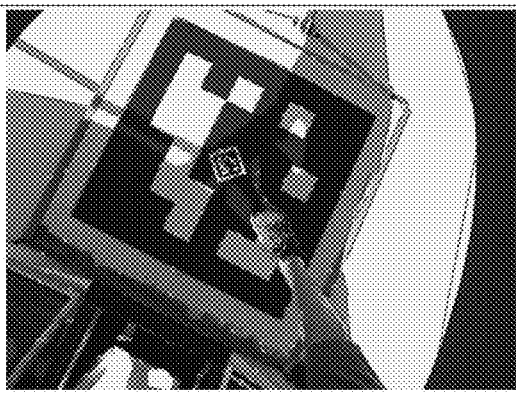
FIG. 2C shows a non-limiting exemplary embodiment of landing target image with notches indicating directionality.
Figure 2D:
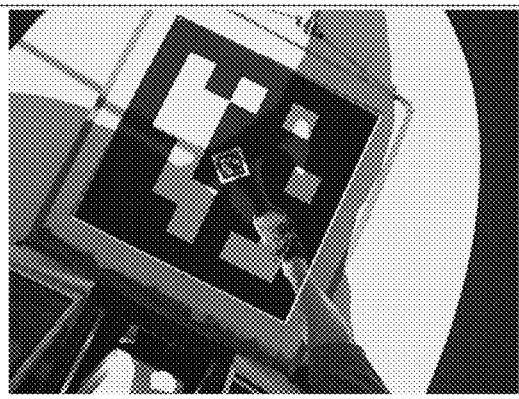
FIG. 2D shows a non-limiting exemplary embodiment of quad detection of a landing target image.

In some embodiments of the subject matter described herein, different types of operations could be performed a heterogeneous unmanned team including an unmanned UAV, USV, and/or UGV. They key enabler to these types of applications is that the UAV can safely and reliably return to the USV, perform a precision landing, and recharge for additional flights.

Recently, standalone stationary charging stations for drones have been developed. These require that a drone precisely lands on a platform that then charges the onboard battery via conduction or induction, or robotically exchanges the battery. These systems are not suitable for use from moving platforms.

Existing UAV charging systems are stationary. Even if s one of these charging stations was strapped to a moving platform, there is no feasible means to get the UAV to land precisely on that truck without a skilled pilot in the loop. Therefore, it would not be an unmanned system. Charging a UAV using the existing technologies requires either manually plugging in a battery, or precisely placing it on a recharging station. Some of these stations will automatically swap out a battery. However, there is no means to use these systems from moving platforms.

Landing on a moving platform for purposes of charging is exceedingly useful. In some cases, it enables drones to be repeatedly deployed from moving platforms without user intervention. On manned vessels, for example, a maritime professional would not have to stop doing his job in order to recharge the drone. From a truck, for example, multiple drone flights could be conducted without ever needing to stop driving. Disclosed herein, in some cases, are software modules for autonomous takeoff and landing to moving platforms that can charge, recharge, exchange batteries, or refuel a drone.

In one aspect, disclosed herein are unmanned aerial vehicles (UAV) that automatically recharges on a moving platform, the UAV comprising: a rechargeable power source; one or more sensors; a digital processing device comprising an operating system configured to perform executable instructions and a memory; and a computer program including instructions executable by the digital processing device to automatically charge the UAV on the moving platform comprising: a software module identifying the moving platform; a software module estimating a real-time state of the moving platform; a software module controlling automatic landing of the UAV on the moving platform based on the real-time state estimation of the moving platform and data collected from the one or more sensors; a software module controlling automatic connection of the UAV to a charging station of the moving platform with a pre-determined orientation; and a software module controlling automatic taking off of the UAV from the moving platform after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, the size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials changes dynamically when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the UAV disclosed herein further comprises a wireless communication unit that communicates with the moving platform. In some embodiments, the UAV disclosed herein further comprises a software module transmitting a position, motion, velocity, acceleration, or orientation of the UAV to the moving platform. In some embodiments, the UAV disclosed herein further comprises a software module transmitting a position, motion, velocity, acceleration, or orientation of the moving platform to the UAV. In some embodiments, identifying the moving platform comprises identifying a landing target on the moving platform. In some embodiments, the UAV disclosed herein further comprises a software module tracking the landing target on the moving platform during automatic landing of the UAV. In some embodiments, the moving platform comprising a wireless communication unit that communicates with a remote control system. In some embodiments, the digital processing device includes a low-size, weight and power (low-SWaP) embedded processor. In some embodiments, the digital processing device is configured to communicate commands to a controller that control one or more propellers, wings or controllable surfaces. In some embodiments, the UAV disclosed herein further comprises a reversible mechanical interface configured to secure the UAV to the moving platform during charging. In some embodiments, the automatic landing of the UAV to the moving platform is substantially vertical to the moving platform within a distance to the moving platform. In some embodiments, the automatic taking off the UAV from the moving platform is substantially vertical to the moving platform within a distance to the moving platform.

In another aspect, disclosed herein are methods for automatically charging a unmanned aerial vehicle (UAV) on a moving platform, the method comprising: detecting the moving platform using one or more sensors of the UAV; estimating a real-time state of the moving platform by a computer of the UAV; automatically landing the UAV on the moving platform by the computer, based on the real-time state and data collected from the one or more sensors, wherein the UAV is in a preselected orientation; connecting the UAV to a charging station on the moving platform; and relaunching the UAV after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the methods disclosed herein further comprise communicating with the moving platform via a wireless communication unit. In some embodiments, the methods disclosed herein further comprises transmitting a position, motion, velocity, acceleration, or orientation of the UAV to the moving platform. In some embodiments, the methods disclosed herein further comprises a software module transmitting a position, motion, velocity, acceleration, or orientation of the moving platform to the UAV. In some embodiments, detecting the moving platform comprises identifying a landing target on the moving platform. In some embodiments, the methods disclosed herein further comprise tracking the landing target on the moving platform during automatic landing of the UAV. In some embodiments, the moving platform comprising a wireless communication unit that communicates with a remote control system. In some embodiments, the computer includes a low-size, weight and power (low-SWaP) embedded processor. In some embodiments, the methods disclosed herein further comprise communicating commands to the one or more propellers. In some embodiments, the methods disclosed herein further comprises securing the UAV to the moving platform during charging via a reversible mechanical interface, a reversible magnetic interface, or a combination of mechanical and magnetic interfaces. In some embodiments, relaunching the UAV after charging is substantially vertical to the moving platform within a distance to the moving platform.

In yet another aspect, disclosed herein are non-transitory computer-readable storage media encoded with a computer program including instructions executable by a processor to allow automatic charging of a unmanned aerial vehicle (UAV) on a moving platform comprising: a software module identifying the moving platform; a software module estimating a real-time state of the moving platform; a software module controlling automatic landing of the UAV on the moving platform based on the real-time state estimation of the moving platform and data collected from one or more sensor of the UAV; a software module controlling automatic connection of the UAV to a charging station of the moving platform with a pre-determined orientation; and a software module controlling automatic taking off of the UAV from the moving platform after charging. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the media further comprise a software module transmitting a position, motion, velocity, acceleration, or orientation of the UAV to the moving platform. In some embodiments, identifying the moving platform comprises identifying a landing target on the moving platform. In some embodiments, the media further comprise a software module tracking the landing target on the moving platform during automatic landing of the UAV.

In some embodiments, the moving platform comprising a wireless communication unit that communicates with a remote control system. In some embodiments, the processor includes a low-size, weight and power (low-SWaP) embedded processor. In some embodiments, the processor is configured to communicate commands that control one or more propellers, wings, or other controllable surfaces.

In yet another aspect, disclosed herein are heterogeneous unmanned teams for conducting autonomous offshore inspections, the team comprising: an unmanned surface vehicle (USV) or ground vehicle (UGV) comprising a moving platform, a landing target, and a charging station; and the unmanned aerial vehicle (UAV) comprising: a digital processing device comprising an operating system configured to perform executable instructions and a memory; and a computer program including instructions executable by the digital processing device to automatically charge the UAV on the moving platform comprising: a software module identifying the moving platform; a software module estimating a real-time state of the moving platform; a software module controlling automatic landing of the UAV on the moving platform based on the real-time state estimation of the moving platform and data collected from one or more sensor of the UAV; and a software module controlling automatic taking off of the UAV from the moving platform after charging. In some cases, the heterogeneous unmanned teams disclosed herein further comprise a software module allowing the USV to wirelessly communicate with an unmanned aerial vehicle (UAV), wherein the communication includes a real-time state of the moving platform. In some embodiments, the moving platform includes an unmanned surface vehicle (USV) or an unmanned ground vehicle (UGV). In some embodiments, the one or more sensors includes: a location sensor, a vision sensor, an inertial sensor, an altitude sensor, a pressure sensor, an audio sensor, a field sensor, or a combination thereof. In some embodiments, the real-time state of the moving platform includes a position, velocity, acceleration, orientation, or a combination thereof. In some embodiments, the real-time state of the moving platform is estimated based on: a visual fiducial on or near the moving platform; a series of nested fiducials on or near the moving platform; a dynamically changing tag on or near the moving platform; a GPS-measured location of the moving platform; a RF signal from the moving platform; inertial data from the moving platform; or a combination thereof. In some embodiments, the series of nested fiducials are co-centered. In some embodiments, the size of the series nested fiducials is gradually decreasing. In some embodiments, at least one of the series of nested fiducials comprises masked information. In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials changes dynamically when relative position of the UAV to the moving platform changes during landing. In some embodiments, the dynamically changing tag remains within a field of view of the UAV when relative position of the UAV to the moving platform changes during landing. In some embodiments, the dynamically changing tag is projected on or near the moving platform. In some embodiments, the UAV disclosed herein further comprises a wireless communication unit that communicates with the moving platform. In some embodiments, the UAV disclosed herein further comprises a software module transmitting a position, motion, velocity, acceleration, or orientation of the UAV to the moving platform. In some embodiments, the UAV disclosed herein further comprises a software module transmitting a position, motion, velocity, acceleration, or orientation of the moving platform to the UAV. In some embodiments, identifying the moving platform comprises identifying a landing target on the moving platform. In some embodiments, the UAV disclosed herein further comprises a software module tracking the landing target on the moving platform during automatic landing of the UAV. In some embodiments, the moving platform comprising a wireless communication unit that communicates with a remote control system. In some embodiments, the digital processing device includes a low-size, weight and power (low-SWaP) embedded processor. In some embodiments, the digital processing device is configured to communicate commands to a controller that control one or more propellers, wings or controllable surfaces. In some embodiments, the UAV disclosed herein further comprises a reversible mechanical interface configured to secure the UAV to the moving platform during charging. In some embodiments, the automatic landing of the UAV to the moving platform is substantially vertical to the moving platform within a distance to the moving platform. In some embodiments, the automatic taking off the UAV from the moving platform is substantially vertical to the moving platform within a distance to the moving platform.

In yet another aspect, disclosed herein are unmanned surface vehicles (USVs) or ground vehicle (UGVs) that automatically charges a unmanned aerial vehicle (UAV), the USV comprising: a landing target; a moving platform; a charging station comprising an electronic interface that automatically charges a rechargeable power source onboard the UAV; a reversible interface configured to secure the UAV when landed; a digital processing device comprising an operating system configured to perform executable instructions and a memory; and a computer program including instructions executable by the digital processing device to automatically charge the comprising: a software module allowing the moving platform to wirelessly communicate with the UAV, the communication including a real-time state of the moving platform; and a software module allowing the charging station to automatically charge the UAV to a pre-determined power level.

In yet another aspect, disclosed herein are moving platforms for allowing automatic landing of a unmanned aerial vehicle (UAV) thereon or automatic taking off of the UAV therefrom, the moving platform comprising a landing target comprising: a series of nested fiducials on or near the moving platform detectable by one or more sensors of the UAV; a dynamically changing tag on or near the moving platform detectable by the one or more sensors of the UAV; or a combination thereof. In some embodiments, at least one of the series of nested fiducials is visually detectable by the one or more sensors of the UAV using a pre-determined light band. In some embodiments, the pre-determined light band is a visible light band. In some embodiments, the dynamically changing tag is visually detectable by the one or more sensors of the UAV using a predetermined light band. In some embodiments, the predetermined light band is a visible light band. In some embodiments, the series of nested fiducials are co-centered. In some embodiments, the series of nested fiducials overlaps at least partially with each other. In some embodiments, the series nested fiducials is gradually decreasing in size. In some embodiments, at least one of the series of nested fiducials comprises masked information.

In some embodiments, at least one of the series of nested fiducials is within a field of view of the UAV when relative position of the UAV to the moving platform changes during landing. In some embodiments, at least one of the series of nested fiducials moves outside of a field of view of the UAV when relative position of the UAV to the moving platform changes during landing. In some embodiments, size of one or more of the series of nested fiducials dynamically changes when relative position of the UAV to the moving platform changes during landing. In some embodiments, the dynamically changing tag remains within a field of view of the UAV when relative position of the UAV to the moving platform changes during landing. In some embodiments, the landing target is in close vicinity to a charging station onboard the moving platform. In some embodiments, the moving platform is on an unmanned surface vehicle (USV) or ground vehicle (UGV). In some embodiments, detection of the landing target by the one or more sensors of the UAV includes post-processing of the detected landing target via one or more algorithms onboard the UAV. In some embodiments, the one or more algorithms includes: filtering; sampling, mathematical manipulation, statistical manipulation, segmentation, contouring, clustering, pattern recognition, registration, masking, decoding, encoding, or a combination thereof.

In some cases, the USV operates as the primary or "host" vehicle, while the UAV operates as a supporting vehicle. The UAV executes fully autonomous missions from the USV.

In some cases, system and method disclosed herein should be adaptable to a wide range of operating conditions and missions, rather than be customized for a specific, narrow use case. Furthermore, technologies disclosed herein may be modular so that they can be integrated into various UAV and USV systems either currently available of under development. The ability to reliably land a UAV onto a moving vehicle or vessel, without a pilot in the loop, is the critical piece of the heterogeneous team. In addition, synergistic behaviors, real-time perception, and sensor data sharing between UAV and USVs enable new and complex missions. For example, amphibious reconnaissance, surveillance, and battle space shaping provide the most up to date and accurate information to support military actions.

In some cases, disclosed herein are advances in six technology areas to enable an autonomous UAV-USV system: (1) high-precision autonomous UAV launch & landing from a moving platform, (2) automatic UAV securing and recharging, (3) inter-platform communication networking, (4) multi-agent coordinated control, (5) automated inspection control, obstacle avoidance, and data capture using sensor feedback, and (6) improvements to man-machine interfaces for heterogeneous multi-agent systems.

UAV

Any description herein of a UAV may apply to any type of unmanned movable object (e.g., which may traverse the air, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV may be an aerial vehicle. The UAV may be a drone. The UAV may have one or more propulsion units or propellers that may permit the UAV to move about in the air. In some cases, the UAV may have one or more wings, rudders, other controllable surface, or the like. In some instances, the UAV may be able to rotate about one, two, three or more axes of rotation. The axes of rotation may be orthogonal to one another. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate.

Moving Platforms

Any description herein of a moving platform may apply to any type of movable object (e.g., which may traverse the air, land, water, or space). The moving platform may be an unmanned surface vehicle (USV) or an unmanned ground vehicle (UGV). The moving platform may be a boat, truck, car, van, sled, person, ship, aircraft, submarine, bicycle, motorcycle, crane, tractor, wind turbine, or any other platform that moves relative to its surrounding environment.

UAV Autonomous Launch & Landing from a Moving Platform

In order to allow the UAV to perform its function from a host vehicle or USV without human intervention, high-precision, autonomous launching and landing of the UAV on the host vehicle or USV may be highly desired.

In some cases, the UAV disclosed herein is configured to vertical takeoff and land (VTOL) from moving platforms, for example, vessels at sea, and to navigate relative to the host vessel. In some cases, this technology does not require a UAV pilot in the loop or extensive installed hardware on the vessel. In some embodiments, the autonomous system or unmanned team disclosed herein uses a UAV launch/landing pad, as a non-limiting example, the pad may be a flat 1 m×1 m surface that ensures the UAV has a safe operating location on the vessel. In other cases, the launch/landing pad may be of any sizes that are practical to be used on the moving platform. In additional embodiments, the launch/landing pad may be a three-dimensional shape instead of a flat two-dimensional shape. In some cases, during launch, the UAV is controlled by an on-board computer to ascend above the target pattern, optionally after successful identification of the target, avoiding collisions with the moving platform's superstructure. During landing, in some cases, a software module onboard the UAV controls the UAV to descend onto the target pattern, landing reliably on the pad with high precision and repeatability.

In some cases, the launch/land system relies on three algorithmic components: searching and detection of a landing target, state estimation and tracking of the landing target and host vessel, and high-precision control of the UAV airframe to execute the launch or landing. In some cases, the softwares and algorithms disclosed herein are capable of running in real-time in a low-size, weight and power (low-SWaP) embedded processor on-board the UAV.

In some cases, the launch/land system may reliably operate in winds up to 20 knots, vessel speeds up to 12 knots, and seas up to 2 meters.

In some cases, the UAV, platform, method, and media disclosed herein utilizes artificial intelligence, pattern recognition, machine learning, digital signal processing, image processing in the searching detection, tracking and state estimation of the landing target, the moving platform and/or its host vehicle.

Target Detection

In some cases, a landing target is included on the moving platform in order to assist automatic landing of the UAV to a desired landing point on the UAV, preferably in the predetermined orientation, to be properly connected to the charging station. In some cases, disclosed herein is a launch/landing target that uses a unique information-encoded target pattern. Such target pattern is identifiable by one or more sensors of the UAV. For examples, the target may have a unique 2-dimensional pattern preferably with high contrast as shown in FIG. 2.

In some cases, the target may include one or more markers. The markers may also differentiate the moving platform or a landing target from other objects or regions. The marker may be used as a fiducial marker, which may aid the UAV in navigating to a proper landing position of the moving platform. In one example, the marker may include an asymmetric image or code that may be discernible by the UAV. The fiducial marker may be indicative of the orientation of moving platform relative to the UAV. Thus, the UAV may be able to orient itself properly when landing on the moving platform.

The marker may include a wireless signal being emitted by the moving platform. Alternatively, IR and/or UV light, radio, or audio signals may be provided by the moving platform to assist landing.

In some cases, pattern detection algorithms and software that processes live or high-frame rate signal from one or more UAV sensors. For example, the pattern recognition algorithm may process live video from one or more camera on-board the UAV. The UAV camera may be facing downward and may be adjustable to capture the target from different angles. In some cases, software modules disclosed herein achieve fast runtimes on high-definition (HD) imagery, while remaining robust to variations due to lens distortion, shadows, occlusion, glare, and exposure problems, as highlighted in FIG. 2. Robustness is essential for operations without a pilot in the loop, especially when deployed from unmanned vessels. As a non-limiting example, algorithm/software is used to detect all the line segments of the target and objects near or obstructing part of the target. Based on the detected ling segments, notches are added indicating directionality of the line segments. Afterward, with the a-priori knowledge of the pattern—the pattern is a rectangle or a square, optionally with information of the area of the pattern, the algorithm select and connects the line segments with four corners and missing information filled in.

In some cases, wherein detection of the moving platform and/or landing target of the UGV or UAV by the one or more sensors of the UAV can be achieved with or without post-processing of the detected landing target via one or more algorithms onboard the UAV. In some cases when the detection of the landing target is optimal, no post-processing is used to speed up the detection of the landing target and greatly facilitate real-time estimation of the state information of the moving platform. In other cases, when detection of the landing target includes interferences from shadowing, poor lighting conditions, obstruction in the field of view, or other less than optimal conditions, post processing algorithms may be used to generate accurate and reliable detection of the landing target. In some cases, such post-process algorithms may include any existing digital signal processing algorithms and/or image processing algorithms. As nonlimiting examples, such algorithms can include filtering, sampling, mathematical manipulation, statistical manipulation, empirical manipulation, segmentation, contouring, clustering, pattern recognition, registration, masking, decoding, encoding, compression, decompression, truncation, histogram, or the like.

Figure 3A:
FIG. 3A shows a non-limiting example of an initial search for a landing target during autonomous UAV landing.
Figure 3B:
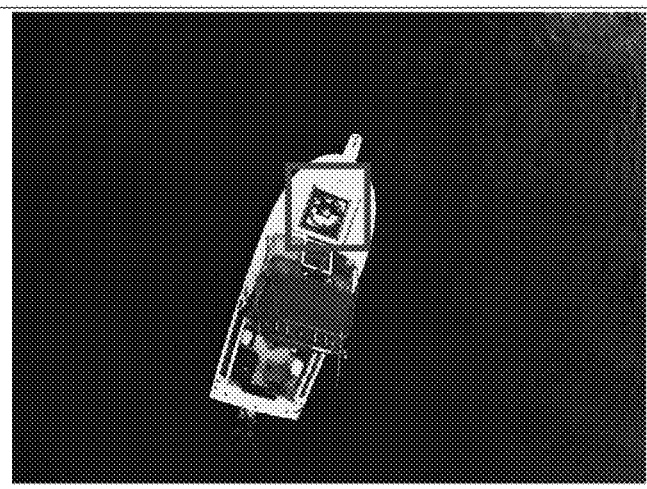
FIG. 3B shows a non-limiting example of detection of the landing target during autonomous UAV landing.
Figure 3C:
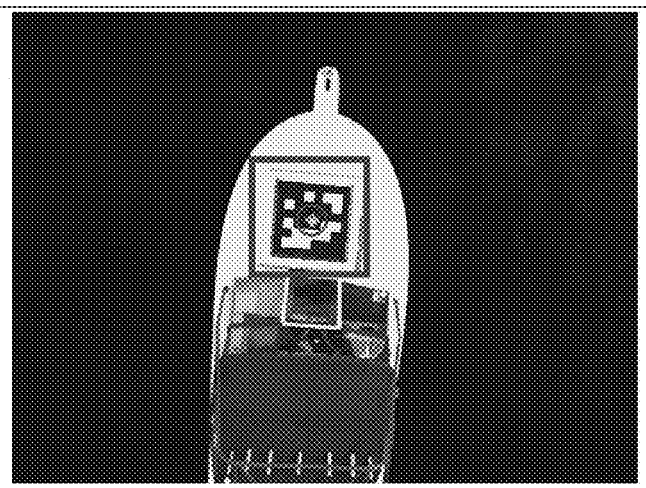
FIG. 3C shows a non-limiting example of maintain a position relative to the landing target during autonomous UAV landing.

In some cases, disclosed herein includes algorithm optimizations and hardware acceleration to enable fast target detection in HD imagery on low-SWAP hardware. In some cases, software disclosed herein can operate in real-time onboard a UAV to search for, detect, and track a target pattern at ranges up to 22 meters or 40 meters altitude above the boat deck. In some cases, the target search algorithm currently runs on a 2 GHz multi-core ARM processor at approximately 15 frames per second (fps). Once the target is detected, additional inter-frame information is used to accelerate detection rates to >30 fps, enabling the detector to lock-on to the target during landing operations, as shown in FIG. 3. In this way, the target detector remains robust to boat motion during the UAV landing.

In some embodiments, the system disclosed herein uses a known fiducial on or near the moving charging platform. In further cases, the fiducial may be visual. In some cases, the UAV identifies the fiducial and extracts range and state information about it in order to guide the UAV to a precise landing. In another variant, the UAV uses data, such as IMU data, from the moving platform to assist in the landing. In yet another variant, the drone and moving platform use an RF-based localization scheme, such as GPS RTK or ultrawideband, for purposes of localization. A deployed system may use any or all of these individually or in combination in order to successfully takeoff and land on the moving platform sufficiently accurately for purposes of energy replenishment. In all cases, the precision guidance, navigation, and control (including landing maneuvers) relative to the moving vessel are a key functional element in the overall recharging method.

The UAV may search for and identify the moving platform by sensing a signal, for non-limiting examples, a signal may be a pattern, an image, a symbol, a decal, a 1-Dimensional (1-D), 2-D, or 3-D barcode, a QR code, or lights detectable on the moving platform. For example the signal may be a light or pattern of lights, not necessary visible light, but also infrared or ultraviolet light, the lights may be turned on only when the moving platform has charging station available. In other cases, the UAV may search for and detect the moving platform by detecting the unique landing target on the moving platform. In further cases, the UAV may identify the moving platform using one or more signal on the moving platform in addition to the landing target.

Target State Estimation

In some cases, target detections are used by the UAV to update a relative state estimate of the landing pad on the vessel. The state estimate includes target motion (heave, sway, surge, or a combination thereof) in position, velocity, acceleration, and orientation (roll, pitch, yaw, or a combination thereof) at one or more time point. In further cases, the state estimate includes target motion (heave, sway, surge, or a combination thereof) in position, velocity, acceleration, and orientation (roll, pitch, yaw, or a combination thereof) over time. In embodiments, the state estimation algorithm enables the UAV to maintain a precise track on the vessel at all times. In further embodiments, the algorithm can predict the vessel state through short periods of detection blackouts, if, for example, the target is momentarily occluded, or the UAV gets blown away from the boat. This feature allows the landing system to recover from environmental anomalies.

In some cases, the state estimation includes artificial intelligence or machine learning that predicts the state based on state of previous time points. In particular, the state information of previous time point may or may not be from the same USV or UGV.

In some cases, the UAV, platform, media, and method disclosed herein utilize information of the surrounding of the UAV, USV or UGV for accurate state estimation in real-time.

UAV Launch/Landing Control

Figure 6:
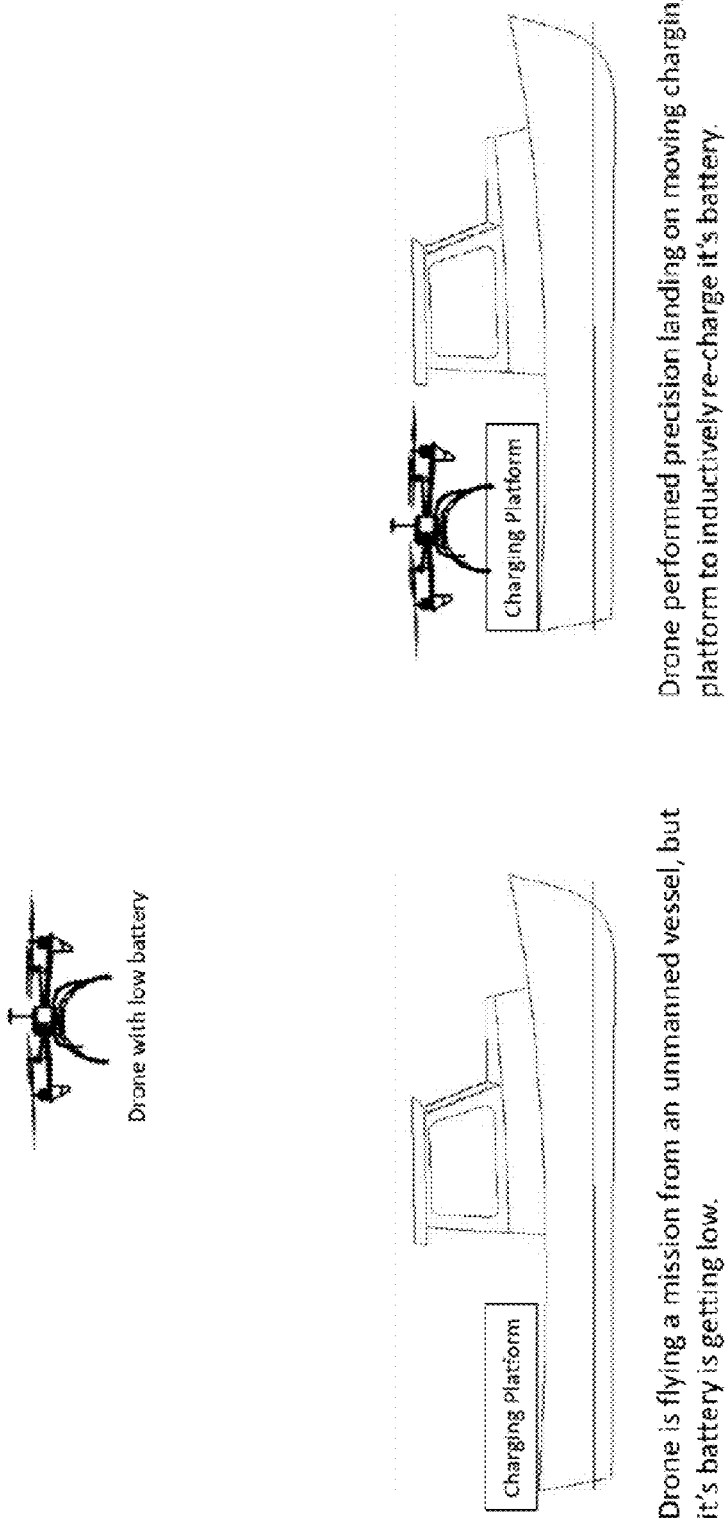
FIG. 6 shows a non-limiting exemplary embodiment of precision landing of a drone on a moving platform as disclosed herein.

In some cases, to ensure safe, accurate and robust autonomous takeoff and landing UAV operation from a moving vessel, an algorithm or software controls the UAV based on the state estimation of the moving platform to safely achieve the desired operation (takeoff or landing), as shown in FIG. 6. In some cases, the algorithm accounts for motion of the vessel during takeoff and landing, ensuring high performances and robustness of the system. In some cases, the algorithm or software that controls the UAV is onboard the UAV. In other cases, the algorithm or software is onboard the UGV or USV but controls the UAV via communication between the UAV and the USV or UGV.

In some cases, the launch/landing system is designed such that the UAV on-board processor acts as an "outer-loop" controller by determining the UAV state actuation (roll, pitch, yaw, and thrust) required to achieve the desired UAV motion. The on-board computer communicates control commands directly to the UAV autopilot, which performs the "inner-loop" control to execute those commands with speed control of the propellers.

In cases where the algorithm or software is not onboard the UAV, various communication modes may be utilized between the UAV and the moving platform. In some cases, such communication modes control the UAV and receive data from the USV or UGV, and transmit data to the USV or UGV.

The UAV may take off and land on the USV vertically. In some cases, the UAV may approach or even land on the USV or UGV and then moves to the landing point on the moving platform of the USV or UGV. In further cases, the landing point is in proximity to the charging station. In further cases, the precise landing point is the point where the UAV can be properly charged automatically on the moving platform. In some cases, the UAV may move on the moving platform after charging before it takes off to avoid possible obstacles in a direct taking off route. In some cases, the landing point may partly or completely overlap with the landing target. In some cases, the landing point may fall within the landing target. In some cases, the landing point may be in close proximity to the landing target in three-dimensions.

Wireless communication between the UAV and the USV or UGV may be used to get the UAV to the general location of the moving platform. The UAV may employ GPS or other locating techniques to identify the USV or UGV. The GPS or other location techniques can be used to get the UAV to the vicinity of the USV or UGV. The wireless communications may get the UAV within range to sense one or more portions of the USV or UGV. As shown in FIG. 3, for instance, the UAV may be brought into a line-of-sight of the moving platform. The landing target may aid in further pinpointing the location of the moving platform. In some cases, one or multiple marker may serve as a confirmation of the landing target of the moving platform on which the UAV may land. The markers may also differentiate the moving platform or a landing target from other objects or regions.

The marker may be used as a fiducial marker, which may aid the UAV in navigating to a proper landing position of the moving platform. In one example, the marker may include an asymmetric image or code that may be discernible by the UAV. The fiducial marker may be indicative of the orientation of moving platform relative to the UAV. Thus, the UAV may be able to orient itself properly when landing on the moving platform. The marker may also be indicative of the distance relative to the UAV. This may be used separate from or in combination with one or more other sensors of the UAV to determine the altitude of the UAV.

In some examples, multiple markers may be provided. The desired landing target or landing point may fall between the multiple markers. The UAV may use the markers to help orient the UAV and/or position its landing between the markers. Distance between the markers may aid the UAV in gaging the distance of the UAV to the landing point/target. The marker may include a wireless signal being emitted by the moving platform. Alternatively, IR and/or UV light, radio, or audio signals may be provided by the moving platform to assist landing.

Automatic UAV Securing and Recharging

In some cases, the UAV-USV team uses an automated method to secure the UAV after landing, recharge the UAV batteries, and release the UAV for takeoff. This is primarily achieved through a mechanical and/or magnetic interface. In some embodiments, systems such as DroneBox, UPS's truck-launched drone delivery system, and Land Rover's Special Vehicle Operations (SVO) unit are aiming to design and build mechanisms to secure, recharge, and launch UAV. In some cases, a system available in the field may be adapted to operate on a USV in the marine environment for similar purposes. Such a securing and recharging system would necessarily have to be integrated onto the USV, including an electrical interface. Multiple existing USVs have modular payload and instrumentation capability and could accommodate integration of such a system.

Communications

In some cases, the proposed UAV-USV/UGV autonomous system disclosed herein communicates between the UAV and USV/UGV, and/or between the heterogeneous unmanned team and a remote device or human user.

Communication links between a UAV and its base station are well established. When the base station is mobile, this link must be modified so that the base station can continually transmit updated location (and possibly orientation) information to the UAV. In some cases, a communications module (a "commbox") is mounted on the USV to perform communication tasks. In some embodiments, the commbox includes a GPS and radio link to the UAV. In further embodiments, the commbox receives and logs UAV sensor data (high resolution imagery, video, IR, LIDAR, etc.) and UAV state telemetry.

Communication networks between a USV and a remote operator are well established. Larger USVs typically carry SATCOM or 4G radios for long-range communications supporting remote operations. These vessels can be interfaced with and controlled by an operator located thousands of miles away.

The disclosed communication system may bridge the UAV and USV networks so that data can be seamlessly transferred between them, and efficiently interfaced to a remote device or user. In some cases, the UAV commbox may be mounted on the USV, and linked in to the USV network, for example, SATCOM network. In other cases, the commbox functionality may be added into the existing USV onboard computer, to improve reliability and reduce USV on-board hardware. Either should allow the UAV to share mission data and telemetry with the USV, enabling automated synergistic behaviors between the two vehicles. Remote users could plan and execute UAV missions, as well as retrieve mission data either in real time or upon request.

The UAV may communicate with a USV or UGV. For example, the UAV may transmit information to the USV or UAV regarding the state of the battery on board the UAV, the current flight conditions, time or distance remaining on current mission, battery specifications, battery temperature, UAV specifications, or flight plan. In the case of low battery charge, the UAV may be directed to land at the USV or UGV. If the charge of the battery is too low to permit the UAV to meet the UAV's time or distance remaining on the UAV's current mission, or the UAV flight plan, the UAV may be directed to land at the moving platform. Optionally, the UAV may be directed to land at the moving platform if the state of charge of the battery falls beneath a predetermined threshold.

In some cases, the communication may be bi-directional or uni-directional.

Coordinated Control

In particular embodiments, for true autonomy, the individual vehicles and overall system accept not just command inputs but high-level command intents, and make internal decision on the best course to achieve those goals. Coordinated control for homogeneous robotic teams is well studied, but heterogeneous teams are more complex to deploy, control, and maintain. In some cases, Control objectives need to optimize a shared goal while exploiting the unique capabilities of each platform.

For the automated inspection purpose, for instances, control scheme that utilizes the USV as a ferry, to transport the UAV to each inspection site may be used. When the USV comes close to a wind turbine or other inspection structure, a message is sent to the UAV to launch and begin the inspection process. The USV may then maneuver to a different location for the eventual rendezvous and landing of the UAV to maximize the overall efficiency of inspecting multiple turbines.

Automated Inspection Capabilities

Figure 5:
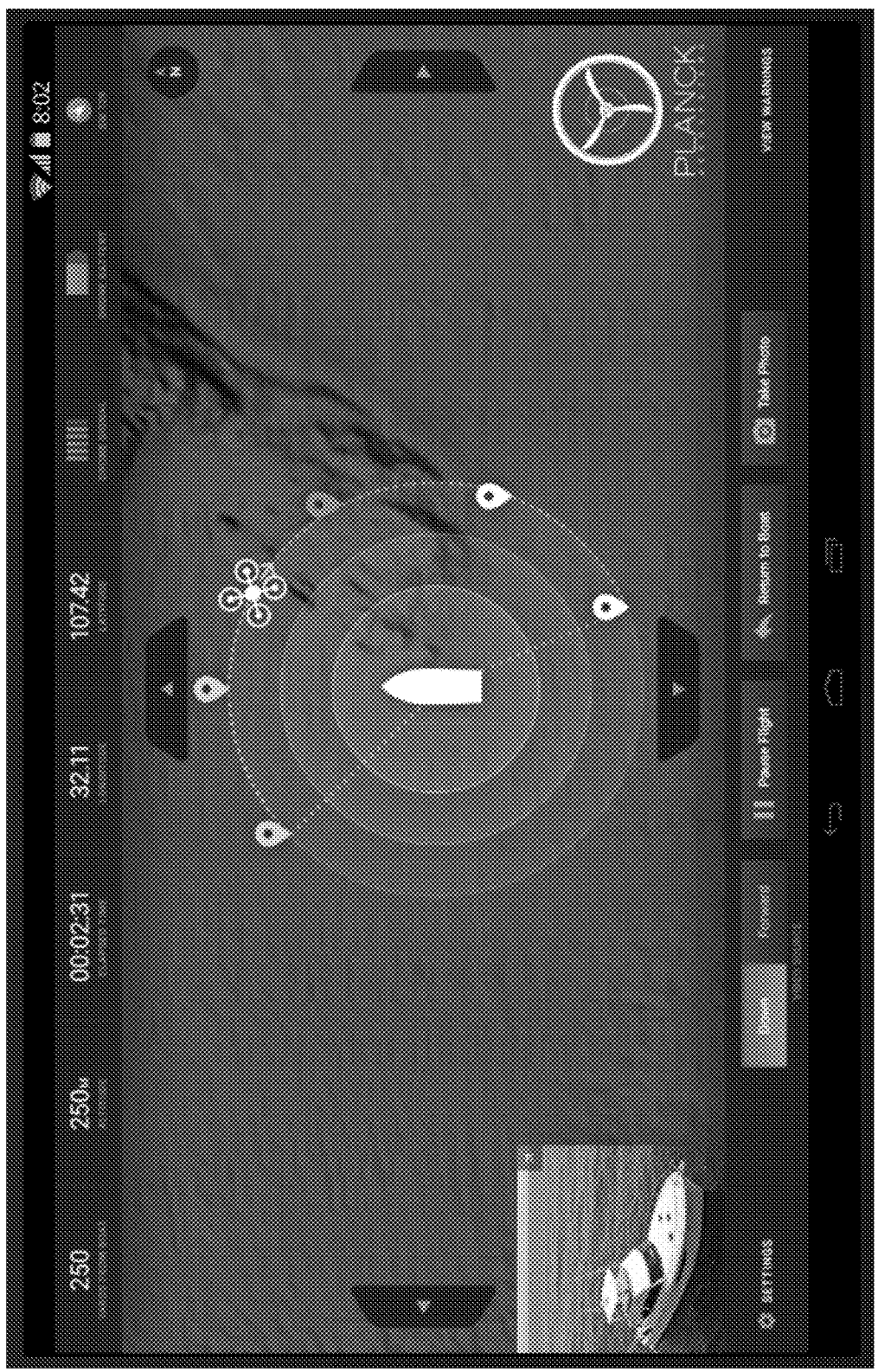
FIG. 5 shows a non-limiting exemplary embodiment of an operator interface as disclosed herein.

A great deal of cost savings is derived from the automation of the data capture when compared to similar operations performed by drone pilots. For instances, automating the UAV inspection can be accomplished with vision-based navigation. In further cases, inspection may become more efficient with an a priori 3D model of the wind turbine to be inspected. An (approximate) flight path that ensures complete visual inspection coverage of the wind turbine can be pre-programmed using the 3D model. However, real-time active collision avoidance will still be required to ensure safe operations. An outer control loop will attempt to follow the planned flight path, while a higher-priority inner control loop will maintain a safe distance from the wind turbine. Advancement of this approach could eventually allow a full, detailed inspection of the wind turbine even while it is operating, which would be a significant logistical and efficiency savings for the wind turbine operator Man-Machine Interfaces for Heterogeneous Multi-Agent Systems In some cases, as unmanned systems transition from remote control to higher-level autonomy, the command and control tools need to similarly evolve to allow the operator to rapidly assimilate information from the field and translate this to new command intents for the robotic team. In some cases, a user interface is included for the UAV-USV teamed system that enables a single user to plan and execute missions, as well as view and share comprehensive fused mission data. There are existing open source and proprietary user interface systems for command & control and data processing for both USV and UAV. By utilizing standard messaging protocols such as MAVLink, and published application program interfaces (API), a unified user interface may be used. In some cases, the user interface would be accessible to any remote user with the proper credentials, regardless of their location, for example, via an internet portal. An exemplary operator interface is shown in FIG. 5.

Sensors

In some cases, the UAV, platform, media, or method disclosed herein includes one or more sensors onboard a UAV, or any other unmanned vehicle. Example of sensors may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, LIDAR, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

In some cases, the sensors disclosed herein include a field of view, resolution, sensor data size, and sensor data dimension. As a nonlimiting example, the sensor may be a camera with a typical field of view about 5.12 meters by 5.12 meters, an image size of 512×512 pixels, thus, the image resolution is about 1 cm by 1 cm. In some case, the field of view of the sensor onboard the UAV is equivalent to the field of view of the UAV. If a visual fiducial is completely included in the field of view and occupies at least 20% of the field of view of the UAV, then the fiducial is about 1.02 meters by 1.02 meters.

Nested Tags

Figure 7:
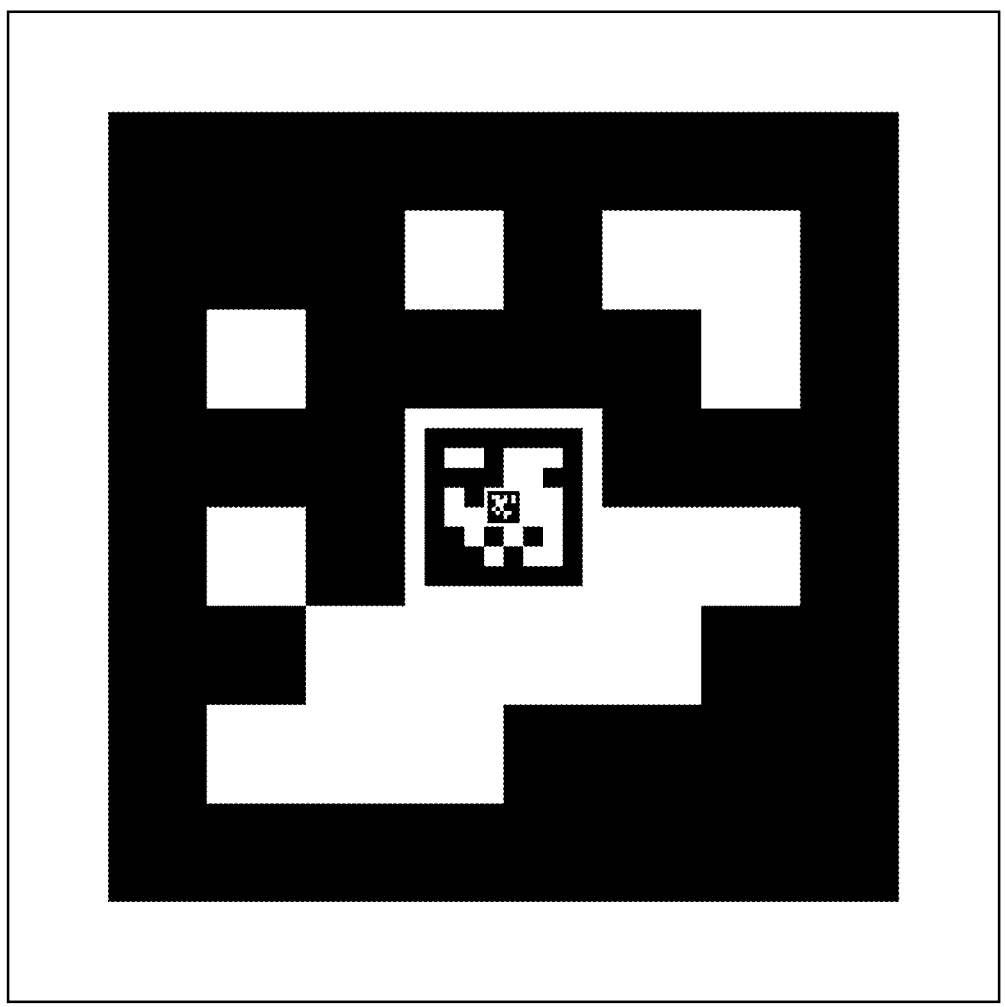
FIG. 7 shows a non-limiting exemplary embodiment of nested visual fiducials/tags as disclosed herein.

In some embodiments, the systems and methods disclosed herein include one or more tags, one more fiducials, or use of the same. In some embodiments, the tag or fiducial herein are visually identifiable. In some embodiments, each tag (or, equivalently, visual fiducial) has black and white boxes as shown in FIG. 7, and each one of those boxes is a "bit" of data. In some cases, the boxes may or may not be of the same spatial size.

The UAV, platform, or method disclosed herein, in some instances, include a nested visual fiducial (or equivalently as "a nested tag" herein) system as shown in FIG. 7. In some cases, visual fiducials herein to provide detection of known landing location that is robust to occlusions, shadows, and lighting conditions. It also may minimize false positives, which can be catastrophic during a landing maneuver. Furthermore, state information (distance, pose, etc) of the moving platform, for example, of the USV or UGV, may be extracted visually from the tag, which is important for the estimation and control of the UAV. In some cases, the system and method herein includes a series of nested tags. In further cases, each one of the series of nested tags gradually becomes smaller than the previous one that are co-centered. When the UAV gets close to the moving platform, a single tag may move out of the field of view of the sensor(s) onboard the UAV. By using nested tags, it may ensure that one or more of the series of nested tags may be within the field of view, even when the aircraft is very close to the tag or the moving platform. The system and method herein may be able to differentiate between the different tags and hand off from one to another seamlessly. In order to do that, in some cases, some bits of the tag are masked in software for example, the software selectively ignores the specific bits (so they are not attempted to be decoded), which speeds up the detection of the tag(s) significantly. In some cases, a number of bits are masked electronically or visually, optionally by a software, by a sensor, or any other appropriate tangible or nontangible elements. In some cases, the masked bits are located in or near the center. In some cases, the computer/software may ignore certain bits. In some embodiments, a nested tag may be put in the place of the ignored bit(s). The nested tag approach is very important especially where the moving platform continues to move significantly even when the aircraft is close to landing.

The visual fiducial or tag may provide a marker on a moving platform that allows algorithm(s) onboard the UAV, for example, computer vision algorithm(s), to determine relative position, distance, and pose of the moving platform in a very efficient manner. The tags may be encoded, so that the algorithm does not accidently detect something else as a tag. In some cases of using tags to aid in drone precision landing and takeoff operations, a single tag is insufficient. This may be because the tag of a given size might be good to at a certain range, but too large or small at other ranges. For example, a tag that measure 1×1 meters can be readily detected at 20 meters by the camera and algorithm. However, due to the field of view limits of the onboard camera of the UAV, it may not be detectable at 2 meters. To have detectable tags at all times, until landing, smaller tags may be added within the larger tag. For example, a tag that measure 10×10 cm may be placed inside of the larger tag. This smaller tag may not detectable from 20 meters away, but detectable from 2 meters away. Therefore, the algorithm can hand-off from a larger to smaller tag and maintain positive detections and different ranges. In some cases, a third smaller tag may be used for detections at even closer ranges, around 20 cm. In some embodiments, these tags of decreasing sizes are nested inside one another. This nested tag design may have several advantages. One is that they are co-centered, which makes the landing processes smoother. Another advantage may be within the computer vision algorithm itself, because the tags may share the center 4-bits that is masked or encoded for the algorithm to detect and provides a very low false-detection rate. The nested tag allows for high-reliability detections at ranges of different orders of magnitude. It may also allow the detection algorithm to automatically mask the center bit shared by multiple tags, so that the smaller nested tags do not interfere with the detection of the larger tags as shown in FIG. 7. The algorithm may selectively ignore the smaller tags when decoding the larger tag.

Dynamic Tag Resizing

Figure 8:
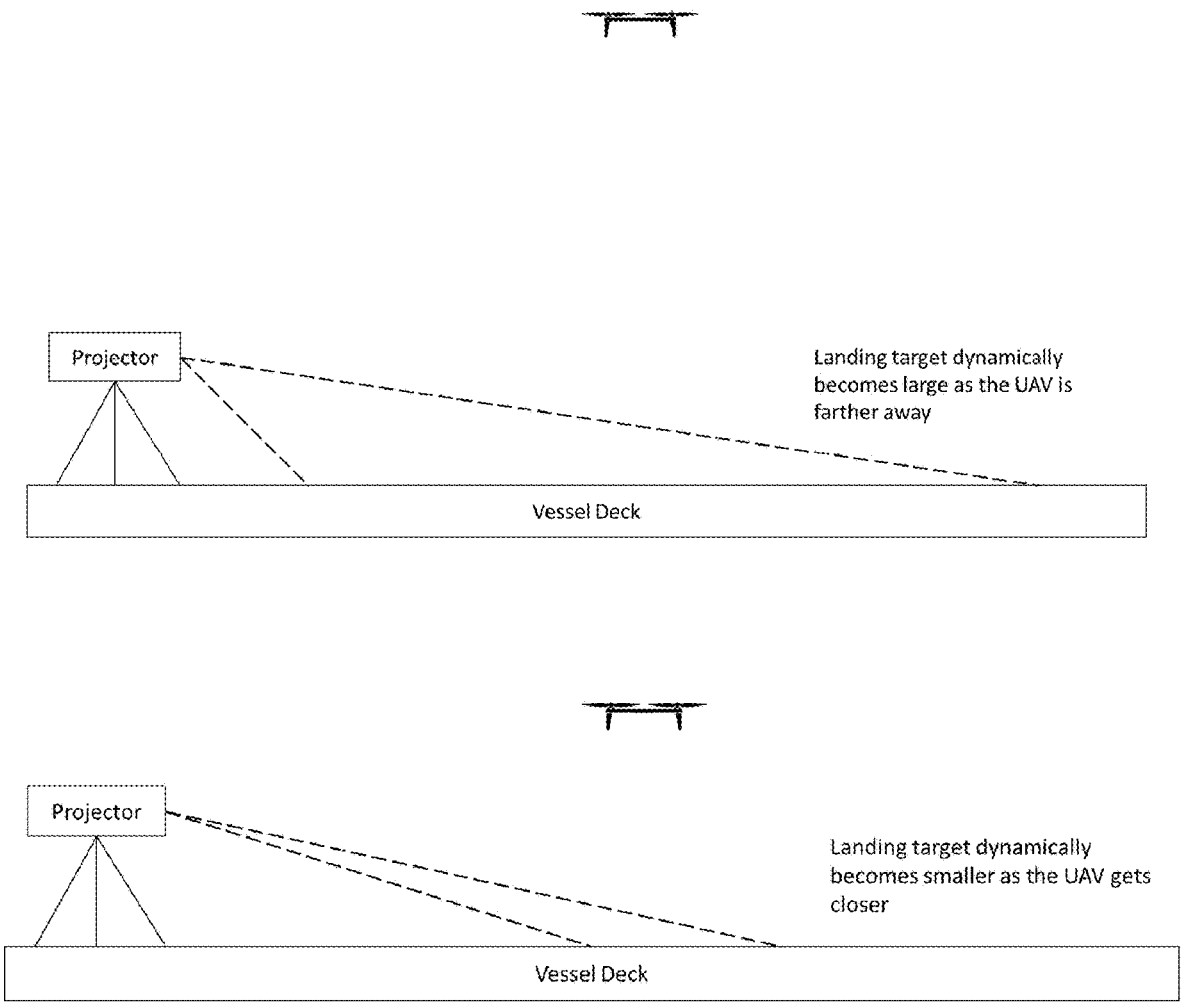
FIG. 8 shows a non-limiting exemplary embodiment of a tag that dynamically changes its size as disclosed herein.

For instances, the system and method herein may have the ability to dynamically change the size of one or more tags to increase the detection range and improve the measurement capability during landing. An exemplary embodiment of the tag with dynamically changing sizes is shown in FIG. 8. The size of the tag can be dynamically changed in several ways. As a non-limiting example, the tag can be projected onto a surface, optionally on the moving platform. Based on the height of the UAV, the projected tag may increase or decreased in size. For given camera parameters (field of view, resolution, focal length), a tag of a given size may be detected at a relatively short distance during landing. For example, a 1 meter tag (along its largest dimension, length, width, or diagonal) with a typical camera set up would be detectable at 20 meters away from the camera. In order for the tag to be detectable at 100 meters, either the camera changes (including zooming) or the tag increase in size, or both. There can be many issues with relying on the camera to properly zoom in and out, so the focus is changing the size of the tag. Not only can the tag get larger to be detectable at a longer range from the UAV, but it may also get smaller as the UAV gets closer so that it can continue to track the tag at close range in the field of view.

In some cases, an electronic screen may display a tag and change the actual size of that tag based on the range of the UAV to the moving platform. In other cases, a projector that projects the tag onto a flat surface, and actively changes the size of the projection. In other cases, a mechanical device may expand or contract the size of the tag.

The tags disclosed herein, especially the nested tags and the dynamically changing tags may increase the range of detections dynamically. For example, if a ship has a very large superstructure that is 100 meters high, a very large tag may be needed for the drone to be able to detect the ship while avoiding the superstructure. But as the drone descends, the size of the tag may have to change so that it can stay within the field of the view of the camera of the UAV.

In some cases, at least one of the series of nested fiducials disclosed herein is visually detectable using a predetermined light band. In some cases, the dynamically changing tag disclosed herein is visually detectable using a predetermined light band. In further cases, the pre-determined light band is one or more of a visible light band, an Infrared (IR) band, a near-infrared (NIR) band, an Ultraviolet (UV) light band, or the like.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 4:
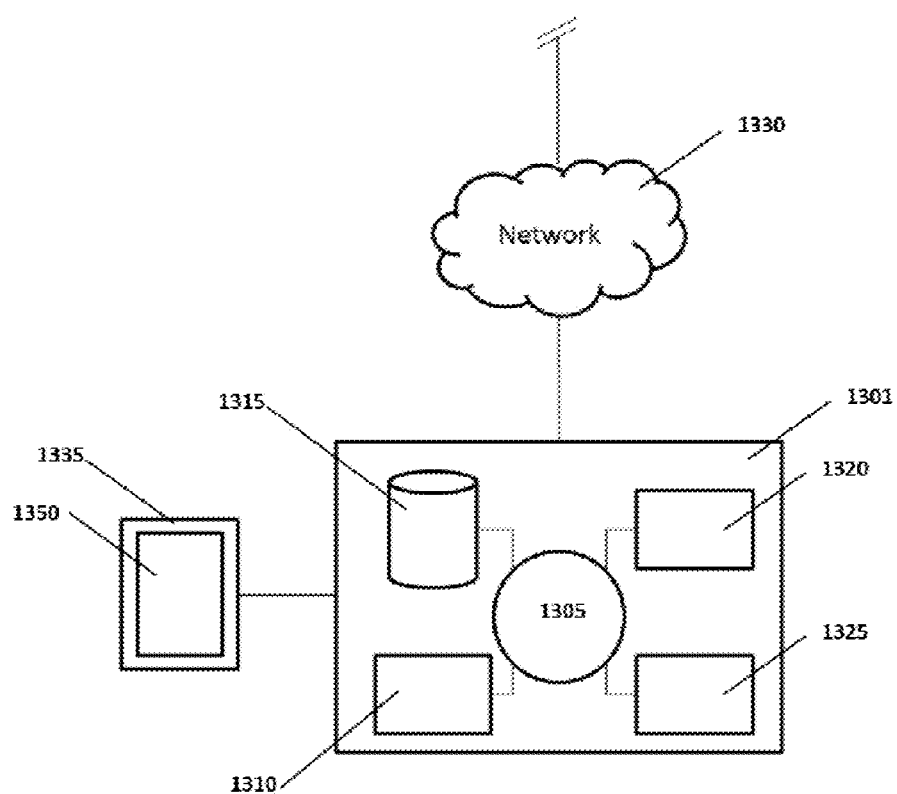
FIG. 4 shows a non-limiting exemplary embodiment of a digital processing device as disclosed herein.

Referring to FIG. 4, in a particular embodiment, an exemplary digital processing device 1301 is programmed or otherwise configured to enable real-time state estimation, precision landing, control, or other functions disclosed herein. In this embodiment, the digital processing device 1301 includes a central processing unit (CPU, also "processor" and "computer processor" herein) 1305, which can be a single core or multi core processor, or a plurality of processors for parallel processing. The digital processing device 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The digital processing device 1301 can be operatively coupled to a computer network ("network") 130 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the device 1301, can implement a peer-to-peer network, which may enable devices coupled to the device 1301 to behave as a client or a server. The digital processing device 1301 can be operatively connected to one or more specialized device (not shown) via the network 1330. Such connection may enable data collection from the device. Continuing to refer to FIG. 4, the CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and write back. The CPU 1305 can be part of a circuit, such as an integrated circuit. One or more other components of the device 1301 can be included in the circuit. In some cases, the circuit is an application specific integrated circuit (ASIC) or a field programmable gate array (FPGA).

Continuing to refer to FIG. 4, the storage unit 1315 can store files, such as drivers, libraries and saved programs. The storage unit 1315 can store user data, e.g., user preferences and user programs. The digital processing device 1301 in some cases can include one or more additional data storage units that are external, such as located on a remote server that is in communication through an intranet or the Internet.

Continuing to refer to FIG. 4, the digital processing device 1301 can communicate with one or more remote computer systems through the network 1330. For instance, the device 1301 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, devices as disclosed herein include one or more databases, or use of the same. In view of the disclosure provided herein, those of skill in the art will recognize that many databases are suitable for storage and retrieval of information related to UAV, USV, UGV, or other elements disclosed herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In some cases, the database may include real-time state information of the moving platform. In some cases, the database may include a history of state information of the moving platform. In some cases, the database may be onboard or accessible by the UAV, UGV, and/or USV. In some cases, the database may include communication data of the UAV, UGV, and/or USV.

In view of the disclosure provided herein, those of skill in the art will recognize that many databases are suitable for storage and retrieval of barcode, route, parcel, user, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Plug-In

In some embodiments, the computer program includes a plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Example 1

In a particular case, a UAV-USV team is deployed in an offshore wind farm. USV is pre-programmed with a route that transits to each turbine and pauses while the UAV inspects the turbine. When the USV reaches each turbine, the UAV autonomously launches from the USV. The UAV uses a pre-programmed flight pattern, together with active obstacle avoidance, to collect high resolution imagery of the entire wind turbine, from all sides, while the turbine is operating. Additional sensor data such as LIDAR and infrared (IR) could be included as well. The complete automated aerial inspection takes as little as 20 minutes. When the aerial inspection is complete, the UAV returns to the USV and executes an autonomous landing onto the USV deck. (Autonomous landings must be precise and reliable despite USV motion, wave action, and wind. Collected imagery is downloaded to the USV, stored, and transmitted to a remote user over SATCOM, 4G, or other means. Optionally, computer vision algorithms on the UAV or USV analyze images for features and faults, enabling an automated alert system for the end user. (For example, images in which corrosion is detected could automatically trigger alerts.) The UAV battery is recharged by the USV using induction or conduction, while the team transits to a location near another offshore wind turbine and repeats some or all of the above steps. These inspections could be fully automated and repeatedly performed throughout a wind farm. Missions could be pre-programmed or modified remotely through the USV's satellite or 4G communications links. The exemplary operations of an unmanned team including a UAV, a USV, communication between the UAV and USV, and communication between the unmanned team to a remote control unit is illustrated in FIG. 1.

Example 2

A UAV-USV system is deployed in the North Sea to inspect offshore wind turbines. This is a harsh environment and risky to send people out. Furthermore, it is costly to shut down the wind turbines to conduct a manned inspection. When the UAV-USV system gets close to a wind turbine, the UAV launches from the USV and fly to close proximity of the turbine and capture high resolution images of it. During this process, the UAV's battery is depleted, so it returns to the USV and executes a precision landing on the charging platform. The USV begins to transit to the next wind turbine. Meanwhile, the charging platform is turned "on" and begins charging the UAV's batteries, via conduction or induction. When the battery is fully charged, the aircraft is ready to conduct another inspection, and the entire process starts anew.

Example 3

Peacekeeping forces are deployed to a hostile area. Some of these troops are tasked with forward reconnaissance to ensure safe passage of a humanitarian aid convoy. These troops are inside an armored vehicle equipped with a drone on the roof. Before they enter a new area, the drone is launched from the roof of their moving vehicle and flies along their planned route, and provides live imagery to the peacekeeping troops in the vehicle. After the imagery is collected, the drone automatically returns to the moving vehicle and lands itself on a platform that rapidly recharges the batteries through conduction, without the need for a human to leave the security of the vehicle. The drone is then ready for its next flight as the troops enter a new hostile zone. In this scenario, it is plausible that the manned vehicle could be replaced with an unmanned ground vehicle.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated. As used in this specification and the claims, unless otherwise stated, the term "about," and "approximately" refers to variations of less than or equal to +/−1%, +/−2%, +/−3%, +/−4%, +/−5%, +/−6%, +/−7%, +/−8%, +/−9%, +/−10%, +/−11%, +/−12%, +/−14%, +/−15%, or +/−20% depending on the embodiment. As a non-limiting example, about 100 meters represents a range of 95 meters to 105 meters (+/−5%), 90 meters to 110 meters (+/−10%), or 85 meters to 115 meters (+/−15%) depending on the embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A platform for operating an unmanned aerial vehicle (UAV) from a vehicle:
   (a) the vehicle comprising a landing pad, a landing target on the landing pad, and a charging station, wherein the landing target comprises a visual fiducial to differentiate the landing target from other objects or regions, wherein the visual fiducial dynamically changes in size; and (b) the UAV comprising:
  i. one or more UAV sensors configured to record sensed data, wherein the one or more UAV sensors comprises a vision sensor configured to record sensed image data;
  ii. an energy storage device;
  iii. a wireless communication device configured to communicate with at least the vehicle; and
  iv. a non-transitory computer-readable storage medium encoded with a computer program including instructions executable by a processor to create a UAV charging application comprising:
    a) a landing pad recognition module identifying the landing pad based on the sensed data, wherein the identifying comprises applying a computer vision algorithm to the sensed image data comprising image data of the visual fiducial of the landing target, thereby identifying the landing target;
    b) a calculation module estimating a real-time state of the landing pad based on the sensed data, the identification of the landing pad, or both;
    c) a navigation module controlling the UAV to:
      (i) land on the landing pad based on the real-time state, the sensed data, or both; and
      (ii) take off from the landing pad; and
    d) an energy module initiating and ceasing charging of the energy storage device via the charging station.

2. The platform of claim 1, wherein the one or more UAV sensors further comprise a location sensor, an inertial sensor, an altitude sensor, a pressure sensor, an audio sensor, a field sensor, or any combination thereof.

3. The platform of claim 1, wherein the real-time state of the landing pad comprises a position, a velocity, an acceleration, an orientation, or any combination thereof.

4. The platform of claim 1, wherein the visual fiducial comprises masked information.

5. The platform of claim 1, wherein a size the visual fiducial changes dynamically during UAV landing.

6. The platform of claim 1, wherein the visual fiducial that dynamically changes in size remains within a field of view of the UAV when landing.

7. The platform of claim 1, wherein the visual fiducial that dynamically changes in size is projected on or near the platform.

8. The platform of claim 1, wherein the wireless communication device is configured to communicate at least one of a position, a motion, a velocity, an acceleration, and an orientation of the UAV to the landing pad, via the wireless communication device.

9. The platform of claim 8, wherein the UAV charging application further comprises a status module receiving at least one of the position, the motion, the velocity, the acceleration, and the orientation of the UAV to the landing pad.

10. The platform of claim 1, wherein the UAV charging application further comprises a tracking module tracking the landing target on the landing pad.

11. The platform of claim 1, wherein the landing pad further comprises a wireless communication unit configured to communicate with a remote control system.

12. The platform of claim 1, wherein the non-transitory computer-readable storage medium comprises a low-size, weight, and power (low-SWaP) embedded processor.

13. The platform of claim 1, wherein the vehicle further comprises a reversible mechanical interface configured to secure the UAV to the landing pad.

14. The platform of claim 1, wherein at least one of the navigation module controlling the UAV to take off and the navigation module controlling the UAV to land comprises controlling the UAV to move in a direction substantially vertical to the landing pad within a distance to the landing pad.

15. The platform of claim 1, wherein the visual fiducial that dynamically changes in size is within a field of view of the UAV when a relative position of the UAV to the landing target changes during landing of the UAV on the landing pad.

* * * * *